US006113189A

United States Patent [19]

Bennett et al.

[11] Patent Number: 6,113,189

[45] Date of Patent: Sep. 5, 2000

[54] RECLINING SEAT BACK ATTACHMENT FOR WHEELCHAIR

[75] Inventors: John Bennett, Rancho Palos Verdes; Willis C. Bradley, Gardena, both of Calif.

[73] Assignee: Lenjoy Engineering, Inc., Gardena, Calif.

[21] Appl. No.: 09/167,007

[22] Filed: Oct. 1, 1998

[51] Int. Cl.[7] .......... B60N 2/02

[52] U.S. Cl. .......... 297/376; 297/183.7; 297/DIG. 4

[58] Field of Search .......... 297/354.12, 354.13, 297/376, 374, DIG. 4, 183.1, 183.6, 183.7, 270.5; 248/200, 218.4, 223.31; 280/250.1, 304.1, 293

[56] References Cited

U.S. PATENT DOCUMENTS

| | | |
|---|---|---|
| 770,395 | 9/1904 | Seng . |
| 2,604,140 | 7/1952 | Bursey . |
| 3,361,474 | 1/1968 | Kolle . |
| 5,127,709 | 7/1992 | Rubinstein et al. . |
| 5,556,168 | 9/1996 | Dinsmoor, III et al. . |
| 5,593,211 | 1/1997 | Jay et al. . |

*Primary Examiner*—Milton Nelson, Jr.
*Attorney, Agent, or Firm*—Natan Epstein; Beehler & Pavitt

[57] ABSTRACT

A reclining seat back replaces a canvas seat back in a wheelchair frame. The reclining back has left and right brackets which attach to existing upright back supports of the wheelchair frame. A reclining back pivoted to the brackets is adjustable to a desired recline position.

15 Claims, 3 Drawing Sheets

Fig. 1
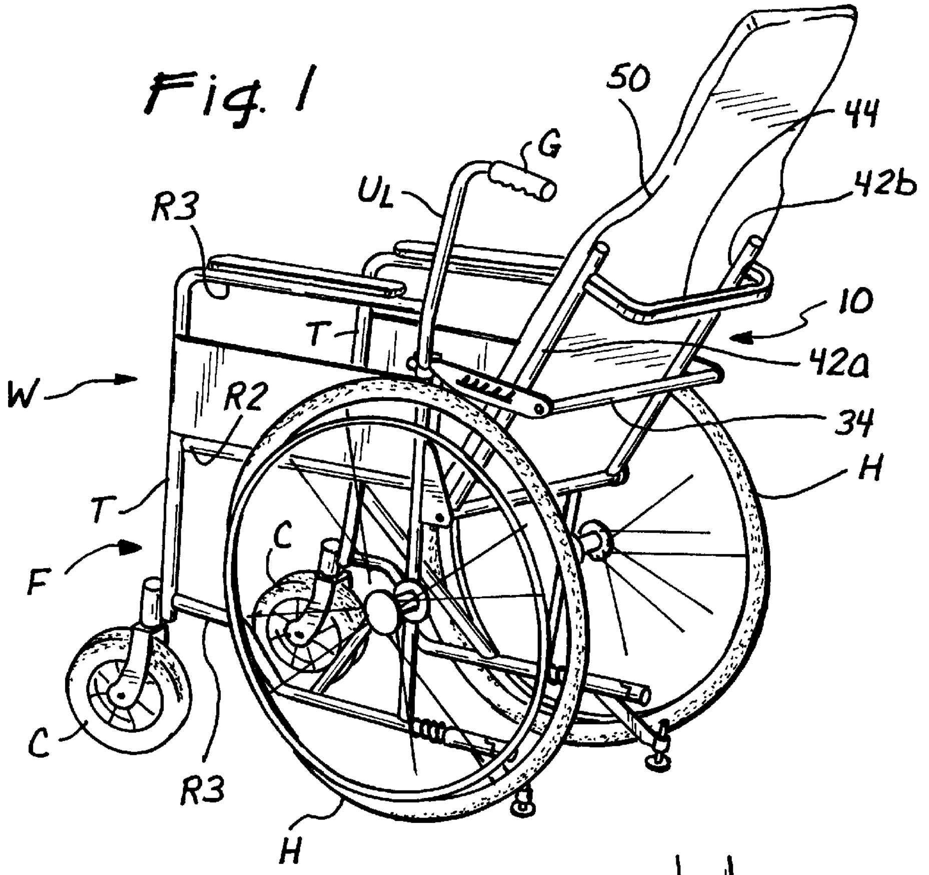
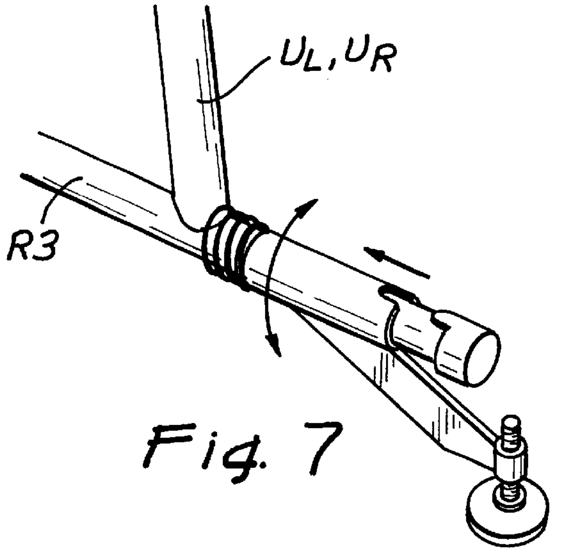
Fig. 7
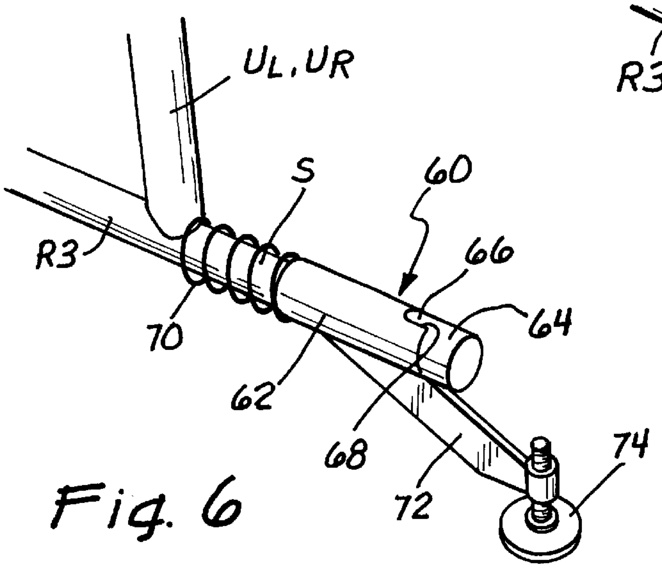
Fig. 6

Fig. 2
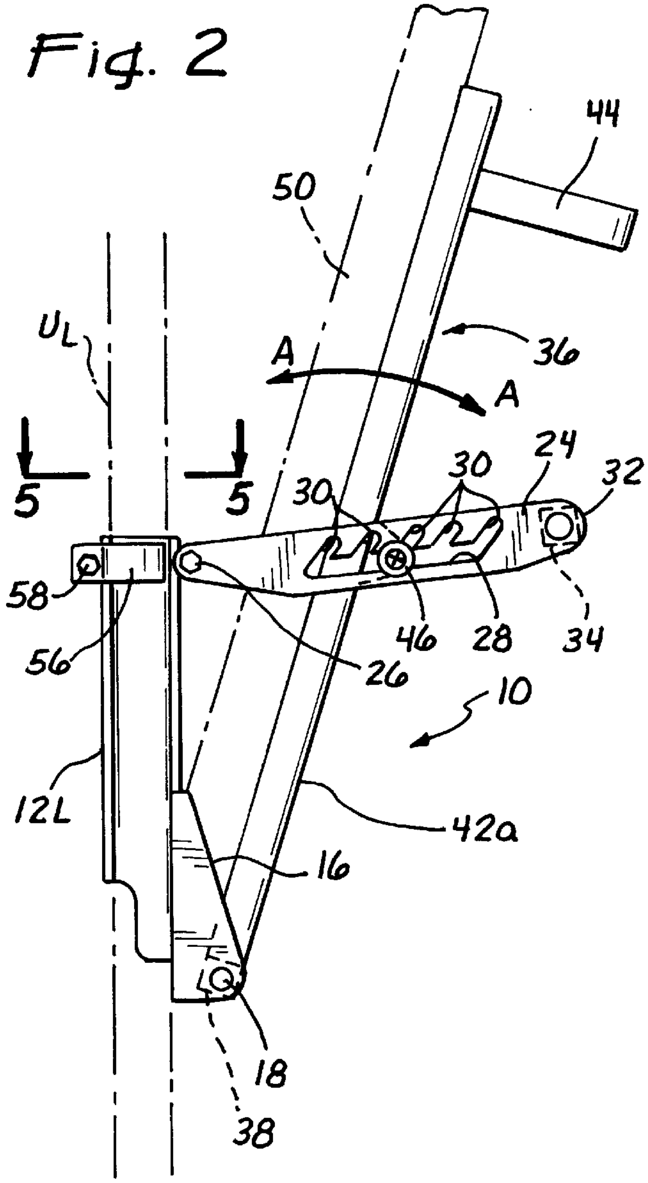
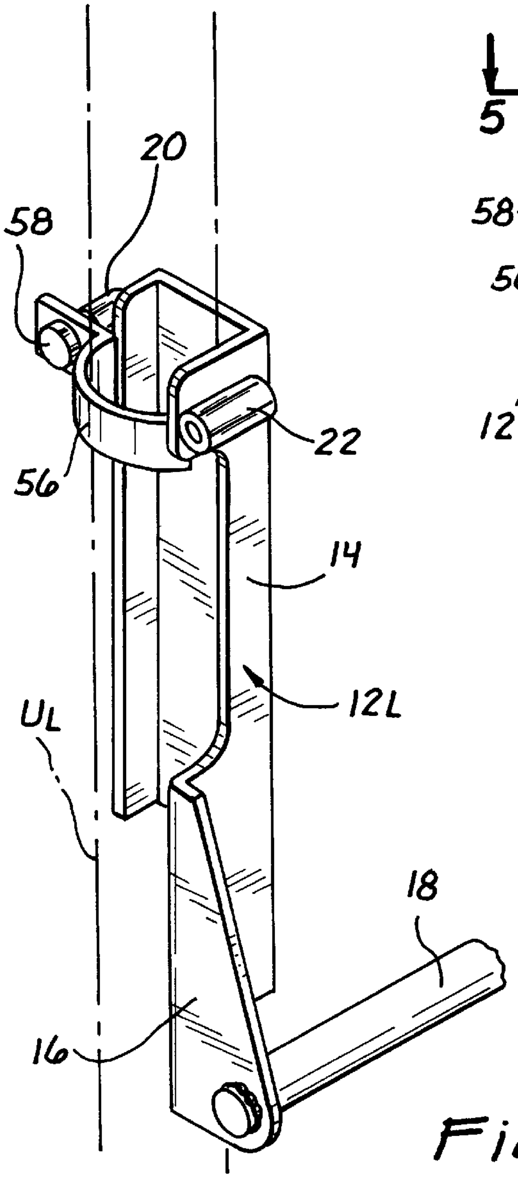
Fig. 3

RECLINING SEAT BACK ATTACHMENT FOR WHEELCHAIR

BACKGROUND OF THE INVENTION

1. Field of the Invention

This invention relates generally to the field of wheelchairs used by the physically infirm and more particularly relates to a reclining seat back attachment for installation in a conventional wheelchair frame as a replacement for an existing non-reclining seat back.

2. State of the Prior Art

Wheelchairs of the type used by the physically infirm or disabled typically have a tubular frame which supports a seat and a seat back and is movable on two large rear wheels which can be manually turned by the user and two smaller caster wheels mounted at the front for stability. The wheelchair frame includes two side assemblies interconnected by a scissor arrangement which permits the wheelchair to be folded along its width for storage or convenient transport. Each side assembly includes a front upright, a rear upright, and several horizontal rails. The upper rail supports an armrest while a middle rail serves to support one side of the seat, typically a canvas sling stretched between the two middle rails on opposite sides of the wheelchair frame. The rear upright may extend above the top rail to provide a pair of grips for use in pushing or otherwise maneuvering the wheelchair by an aide standing behind the chair. The seat back may be supported in a vertical plane between the two rear uprights, and is typically also a canvas sheet which is wrapped around each of the two rear uprights at a suitable height above the seat, for example, along the portion of the rear uprights between the top horizontal rail and the grip. The seat back is normally removable for purposes of cleaning or replacement, and is secured with releasable fasteners such as snap fasteners for this purpose.

Wheelchair frames of the type just described make no provision for reclining the back of the wheelchair seat. While wheelchairs with a reclining back are commercially available, these are costly special purpose wheelchairs. Furthermore, the reclining backs on the existing wheelchairs of this type are awkward and cumbersome to adjust. The one known commercially available model relies on Velcro straps to hold the reclining back at a desired position. Velcro straps on each side of the reclining back must be released, and the seat back positioned and held in place while each strap is individually fastened.

A continuing need exists for a lower cost, easier to adjust reclining back for wheelchairs, and in particular a need exists for a reclining seat back attachment which may be quickly and easily retrofitted onto a conventional wheelchair frame as a replacement for an existing non-reclining seat back.

SUMMARY OF THE INVENTION

This invention addresses the aforementioned need by providing a reclinable seat back attachment for a wheelchair of the type having a wheelchair frame including a pair of upright rear members normally supporting a non-reclining seat back.

The novel seat back attachment has left and right attachment brackets configured to be releasably fastened to respective ones of the rear upright members, a seat back pivoted to the attachment brackets, and first and second detents secured respectively to the brackets and to the seat back. The first and second detents are selectively engageable with each other for detaining the seat back at one of multiple recline positions. Each of the attachment brackets is clamped to a corresponding one of the upright rear tubular members, preferably by a single clamp. Each attachment bracket may have an upper end and a lower end, with the seat back pivoted to each bracket at a point below the first detent. The first detent, in a presently preferred form of the invention, may take the form of a detent plate pivotably attached to each bracket. A guide slot in each detent plate includes multiple detent notches opening laterally at spaced intervals along the guide slot. The second detent may be detent pins extending on either side from the seat back and captive in the guide slot of each detent plate, such that the pins may be engaged in a selected detent notches along the guide slots to detain the seat back at the selected recline position. The seat back attachment may further have a cross member connecting rear ends of the two detent plates. The cross member provides a convenient means by which both detent plates may be simultaneously lifted away from or lowered into engagement with the detent pin.

Each attachment bracket may have a channel portion sized, shaped and adapted to partially circumferentially encompass a corresponding one of the rear upright tubular members of the wheelchair frame, and a clamp detachably secured to the channel portion and adapted to increase circumferential encompassment of the corresponding one of the rear upright tubular members in order to fasten the attachment bracket to the upright member. Each bracket may also have a flange portion to which is pivoted the seat back.

The reclinable back of the seat back attachment may have a back frame pivoted to the attachment brackets and a back pad supported on the back frame. The back frame may include a horizontal pivot member pivotably supported between the attachment brackets, a pair of vertical members secured to the pivot member, and a handle bar connecting the vertical members. Reclining adjustment of the seat back may be made by lifting the cross member to disengage the detent plates from the detent pins, adjusting the recline angle of the seat back to a desired position by pushing or pulling on the handle bar, and then lowering the cross member thereby to reengage the detent plates with the detent pins to detain the seat back in the selected recline position.

In order to keep the wheelchair from tipping over backwards when the seat back is reclined a pair of anti-tipping restraints may be installed on the rear ends of the bottom horizontal rails of the wheelchair frame. Each anti-tipping restraint may have a first member for mounting as by a sliding fit onto the rear end of the tubular rail of the wheelchair frame, a fastener for securing the first member to the tubular rail, and a stand portion affixed to the first member sized and configured to bear against a ground surface under the wheelchair to prevent tipping over of the wheelchair. The stand portion preferably supports a ground contacting glide at a position rearwardly displaced from the rear end of the tubular rail for improved anti-tipping effect of the restraints. In one form of the invention the stand portion is retractable away from contact with the ground surface. In that form of the invention, the first member is slidable and rotatable on a the tubular rail of the wheelchair frame and an end cap is fitted onto the rear end of the rail. The first member when engaged with the end cap is locked against rotation on the rail. A spring normally urges the first member into engagement with the end cap. A stand portion affixed to the first member is sized and configured to bear against a ground surface under the wheelchair in the engaged position of the first member to prevent tipping over of the wheelchair, the first member being disengageable from the end cap against the urging of the spring for rotation to a raised or retracted position away from the ground surface.

The seat back attachment and a pair of anti-tipping restraints may be sold as a kit or set for installation in a particular wheelchair.

These and other features, improvements and advantages of the present invention will be more clearly understood from the following detailed description of the preferred embodiment, taken in conjunction with the accompanying drawings.

BRIEF DESCRIPTION OF THE DRAWINGS

FIG. 1 is a left rear perspective view of a typical wheelchair fitted with the reclining seat back attachment according to this invention;

FIG. 2 is a side elevational detail view of the left attachment bracket showing the pivotal connection of the seat back to the lower end of the bracket and the detent mechanism which provides for selective recline positioning of the seat back;

FIG. 3 is a detailed perspective view of the left side attachment bracket illustrating how the bracket and clamp encompass the rear upright tubular member of the wheelchair frame;

FIG. 6 illustrates an anti-tipping attachment for installation on the rear ends of the bottom horizontal rails of the wheelchair frame, shown in lowered operative position;

FIG. 7 illustrates the anti-tipping attachment of FIG. 6 with the ground contacting leg disengaged from the end cap to free the leg for retraction to a raised position by rotation about the horizontal rail.

DETAILED DESCRIPTION OF THE PREFERRED EMBODIMENT

With reference to the accompanying drawings in which like elements are referenced by like numerals, FIG. 1 shows a wheelchair generally designated by the letter W and which includes a generally conventional wheelchair frame F of welded metallic tubing such as steel or aluminum tubing, of circular cross section supported on two main wheels H and two caster wheels C. The frame F is made of metallic tubing. The tubular frame F includes two front uprights T, left and right rear uprights UL and UR terminating in upper hand grips G and three horizontal rails including top rail R1, middle rail R2 and bottom rail R3. The three horizontal rails connect the front uprights T, with corresponding rear uprights UL, UR on each side of the wheelchair frame.

Figure 4:
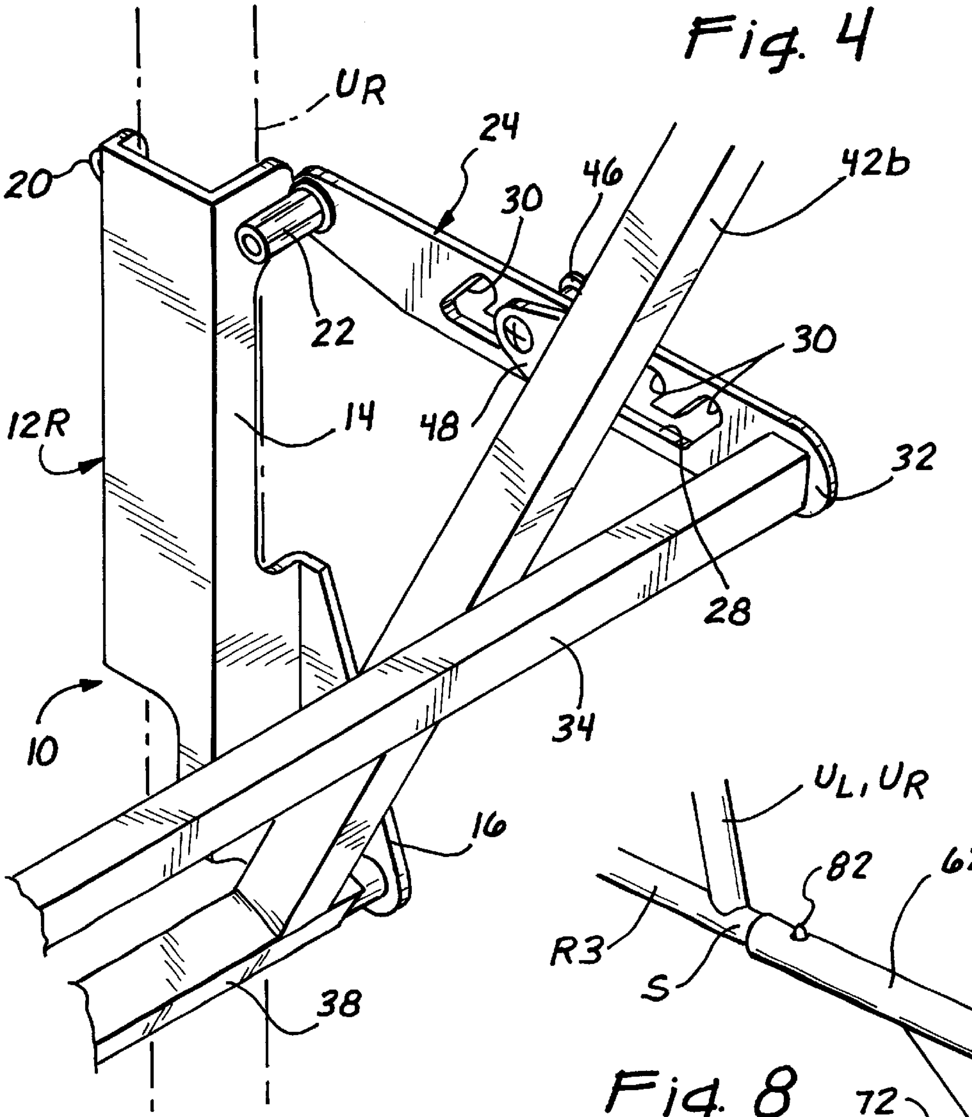
FIG. 4 is a detail perspective view of the right side of the reclining seat back attachment with the back pad removed for clarity of illustration.

The reclining seat back attachment of this invention, generally designated by numeral 10 in the drawings, includes left and right attachment brackets 12*a*, 12*b* respectively, which are best seen in FIGS. 2, 3 and 4. Each attachment bracket has a channel shaped portion 14 which in the presently preferred embodiment has a U-shaped cross section best appreciated in FIG. 5. The cross section of the channel portion 14 is sized, shaped and configured to partially circumferentially encompass the circular cross section of the corresponding rear upright tubular member UL, UR shown in phantom lining in FIGS. 2–5. The left and right attachment brackets are mirror images of each other as best appreciated by comparison of FIGS. 3 and 4. The two attachment brackets are applied to their corresponding uprights in back-to-back relationship to each other, with the open side of the channel portion facing away from the other attachment bracket. A generally triangular flange portion 16 extends from the lower end of the channel portion 14 in a generally radial direction to the corresponding tubular upright member. The two attachment brackets are interconnected by pivot rod 18. The pivot rod is connected at its opposite ends to the flanges 16 of the two attachment brackets, as best seen in FIG. 3. Two interiorly threaded sleeves 20, 22 are welded near the upper end of each attachment bracket. A detent plate 24 is pivotably connected to each attachment bracket 12L, 12R by a bolt 26 inserted through a hole in the detent plate and threaded into sleeve 22, as best understood from FIG. 5. A washer 26*a* inserted between the detent plate 24 and sleeve 22 facilitates pivotal movement of the detent plate about the pivot bolt 26. An elongated guide slot 28 shown in FIGS. 2 and 4 is defined in each detent plate, along with five detent notches 30 opening into the guide slot at regular intervals along the length of the guide slot. The rear ends 32 of the two-detent plates 24 are connected to each other by a cross member 34, shown as a length of tubing of rectangular cross section.

A seat back pad 50 is mounted to a back frame 36 as seen in FIGS. 1 and 2, and provides back support for a person seated in the wheelchair W. The back pad 50 together with the back frame 36 are movable through a range of recline positions determined by the length of the guide slots 28 and can be selectively detained at any one of multiple recline angles corresponding to the five detent notches 30.

The back frame 36 includes a horizontal pivot member 38, shown as a length of rectangular tubing rotatably supported on the pivot rod 18 between the left and right attachment brackets 12L, 12R. Two vertical elements 42*a*, 42*b* have lower ends welded to the horizontal pivot member 38, and are connected near their upper ends by a horizontal handle bar 44, as best shown in FIG. 1. The four elements of the back frame, 38, 42*a*, 42*b* and 44 are made of rectangular metal tubing welded together to make a strong and rigid frame, which is movable through an arc indicated by arrow A—A in FIG. 2 relative to the attachment brackets 12L, 12R.

A pair of detent pins 46, each fixed to one of the vertical members 42*a*, 42*b* of the back frame, is captive in the guide slots 28 of the detent plates 24. While suitable detent pins can be made in many different ways, in this embodiment it is convenient to make each detent pin as a sleeve welded at one end to a supporting flange 48 which is itself welded to the corresponding vertical member 42*a*, 42*b*. A bolt or screw is threaded into the other end of the sleeve and a washer of sufficient diameter is captive between the sleeve and the head of the bolt to ensure that the sleeve cannot withdraw from the guide slot 28 in a direction transverse to the detent plate. Each detent pin 46 can be received and retentively engaged in any one of the detent notches 30 along the guide slots 28.

Reclining adjustment of the seat back is conveniently made by lifting the detent plates 24 away from engagement with the detent pins 46, positioning the seat back 50 at a desired recline angle, and then lowering the detent plates into engagement with the detent pins 46 so that the detent pins are received in a selected notch 30, thereby detaining the seat back in the selected recline position. This adjustment operation can be conveniently made by simultaneously lifting both detent plates by means of cross member 34 and pushing or pulling on the handle bar 44 to position the seat back at the desired recline angle, then lowering the cross member 34 to lower both detent plates into engagement with the corresponding detent pins.

Figure 5:
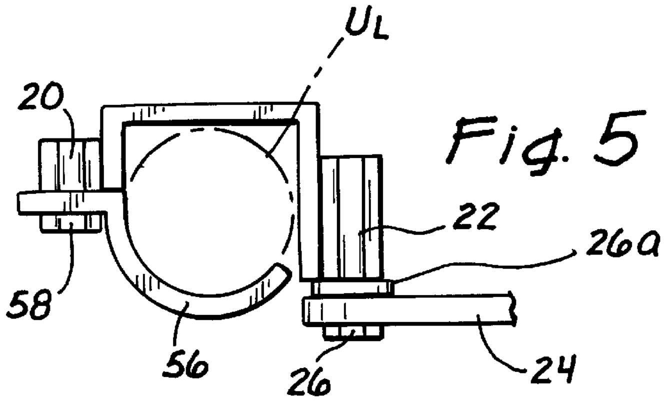
FIG. 5 is a top end view taken along line 5—5 in FIG. 2 showing the attachment bracket and clamp assembly encompassing the rear upright tubular member, the latter shown in phantom lining.

The seat back attachment 10 is secured to the wheelchair frame F by clamps 56. A clamp 56 is fastened to the threaded sleeve 20 of each attachment bracket 12L and 12R by a bolt 58, as shown in FIGS. 3 and 5. The clamps 56 add to or complement circumferential encirclement of the rear upright tubular members UL, UR by the attachment brackets to capture the upright member in the channel shaped portion 14 of the attachment bracket and thereby positively secure the attachment bracket to the upright member. Installation of the seat back attachment 10 on an existing conventional wheelchair frame F is simple and easy. Any existing non-reclining seat back is detached and removed from the wheelchair frame. The clamps 56 are removed from the attachment brackets 12L, 12R, and the seat back attachment 10 is moved into position relative to the wheelchair frame F so that each attachment bracket is fitted onto and receives a corresponding rear upright tubular member UL, UR. The attachment brackets are supported vertically on the middle rails R2 of the frame F to keep the seat back attachment from sliding along the rear upright members. The attachment 10 is then secured to the wheelchair frame by reattaching and tightening the clamps 56 onto the attachment brackets and against the upright tubular members as shown in FIGS. 3 and 5. The seat back attachment 10 is just as readily removed from the wheelchair frame to permit a conventional non-reclining seat back to be reinstalled, if desired. It will be apparent from the drawings, particularly FIGS. 1 through 4 that the two attachment brackets 12*a*, 12*b* are connected to each other by the pivot rod 18 at their lower ends and by the cross-member 34 which is connected in turn between the detent plates 24. As a result the two brackets 12*a*, 12*b* are supported in mutually spaced relationship when removed from the wheelchair frame and the entire seat back 10 can be stored and carried as a unit when not in use on the wheelchair.

The reclining seat back attachment 10 is of relatively simple but strong and dependable construction, and when retrofitted to a conventional wheelchair provides reclining back capability at relatively modest cost without requiring the purchase of a costly and less adaptable special purpose wheelchair. The seat back 10 can be removed when no longer needed and reinstalled in another wheelchair, permitting considerable flexibility and efficient use of resources in a medical care facility.

As a complement to the reclining back attachment 10, it is desirable to install a pair of anti-tipping attachments 60 on the wheelchair frame F, as illustrated in FIGS. 6 and 7. The purpose of the anti-tipping attachments is to safeguard against the possibility of tipping over the wheelchair W backwards when the seat back 50 is so far reclined that the combined center of gravity of the wheelchair and user shifts behind the axis of the main wheels H. The anti-tipping attachments 60 are conveniently installed on existing rear end portions S of the bottom horizontal rails R3 of the wheelchair frame. Typically, the bottom rails have a segment S which extends rearwardly of rear upright members UL, UR and terminate in a free rear end. The anti-tipping attachment generally designated by numeral 60 in FIGS. 6 and 7 includes a tubular first member or sleeve 62, in the form of a cylindrical tube segment which makes a close sliding fit on the rail segment S and is freely slidable and rotatable thereon. An end cap 64 is fitted onto the free rear end of the bottom rail R3 and secured in place by any convenient means. The end cap 64 has an axially extending finger 66, which fits into an axial notch 68 cut in the rear end of the sliding sleeve 62. A coil spring 70 is axially mounted on the tubular segment S and is in compression between the upright member UL, UR and the front end of the sliding member 62, continuously urging sleeve 62 towards the end cap 64. A leg 72 extends radially and also rearwardly from the sliding member 62, and terminates in a ground contacting glide 74 positioned rearwardly of the end cap 64 for greater effectiveness in preventing backward tipping of the wheelchair. Retraction of the attachment 60 is accomplished by displacing the sleeve 62 away from engagement with the finger 66 of end cap 64, compressing the coil spring 70 as shown in FIG. 7. Sleeve 62 can then be turned about the tubular segment S, raising the leg 72 and glide 74 to a retracted position away from ground contact.

Figure 8:
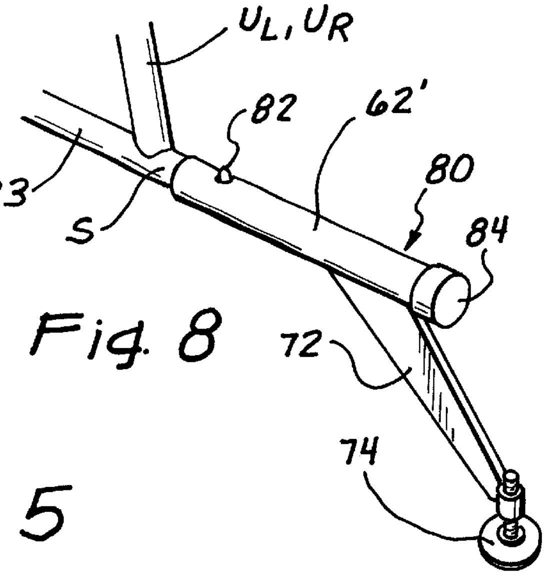
FIG. 8 shows an alternate non-retractable form of the anti-tipping attachment.

A non-retractable version of the anti-tipping attachment, designated by numeral 80, is depicted in FIG. 8 and differs from the retractable embodiment of FIGS. 6 and 7 in that the sleeve 62' is fixed onto the tubular segment S by a fastener such as screw 82, securing the leg 72 and glide 74 in ground contacting position. An end cap 84 may be provided for protective and ornamental purposes.

It is contemplated that the seat back attachment 10 and a pair of anti-tipping attachments, either retractable or fixed, would be provided as a kit or a set for installation on a given wheelchair W.

While a particular embodiment of the invention has been described and illustrated for purposes of clarity and explanation, it must be understood that many changes, modifications and substitutions to the described embodiment will be apparent to those possessed of ordinary skill in the art without thereby departing from the scope and spirit of the present invention which is defined by the following claims.

What is claimed as new is:

1. A reclinable seat back attachment for a wheelchair having a wheelchair frame including a pair of rear upright tubular members normally supporting a non-reclining seat back, said seat back attachment comprising:

left and right attachment brackets configured and adapted to be releasably fastened to respective ones of said rear upright tubular members;

a seat back having a lower end pivoted to said attachment brackets; and first detent means secured to said brackets, second detent means on said seat back at a location upwardly spaced from said lower end, said first and said second detent means being selectively engageable with each other for detaining said seat back at any one of multiple selectable recline positions, said seat back being pivotable on said brackets between said recline positions in a disengaged condition of said detent means.

2. The seat back attachment of claim 1 wherein said attachment brackets comprise one pair of brackets, each of said brackets having an upper end and a lower end, and said seat back is pivoted to each bracket near said lower end and said first detent means is attached near said upper end of said bracket.

3. The seat back attachment of claim 2 wherein said attachment brackets each have a single clamp for securing each bracket to a corresponding one of said upright tubular members.

4. The seat back attachment of claim 1 wherein said attachment brackets each have a channel portion sized and shaped adapted to partially circumferentially encompass a corresponding one of said upright tubular members, and a clamp detachably secured to said channel portion and adapted to complement circumferential encompassment of said corresponding one of said upright tubular members.

5. The seat back attachment of claim 4 wherein said brackets each further have a flange portion extending from said channel portion, said seat back being pivoted to said flange portion.

6. The seat back attachment of claim 1 wherein said first detent means comprises a detent plate pivotably attached to each said bracket, a guide slot defined in said plate and multiple detent notches opening laterally along said guide slot, and wherein said second detent means is a detent pin extending from said seat back and captive in said guide slot of each detent plate, such that said pin may be engaged in a selected one of said multiple detent notches thereby to detain the seat back at the selected recline position.

7. The seat back attachment of claim 6 further comprising: cross-member connecting said detent plates by which both detent plates may be simultaneously lifted away from or lowered into engagement with a corresponding detent pin.

8. The seat back attachment of claim 7 wherein said seat back comprises a back frame including a horizontal pivot member pivoted to said attachment brackets, and a back pad supported on said back frame for movement therewith through an arc, whereby reclining adjustment of the seat back may be made by lifting said cross-member to disengage the detent plates from the detent pins, adjusting the recline angle of the seat back and back frame to a desired position, and then lowering the cross-member thereby to reengage the detent plates with the detent pins to detain the seat back and back frame in the selected position.

9. The seat back attachment of claim 8 further comprising a handle bar secured to said back frame by which the back pad and back frame can be pushed or pulled to a desired recline position.

10. The seat back attachment of claim 9 further comprising a handle bar secured to a back side of the seat back, whereby reclining adjustment of the seat back may be made by lifting said cross-member to disengage the detent plates from the detent pins, adjusting the recline angle of the seat back to a desired position by pushing or pulling on said handle bar, and then lowering the cross-member thereby to reengage the detent plates with the detent pins to detain the seat back in the selected position.

11. The seat back attachment of claim 9 wherein said attachment brackets each have an upper end and a lower end, and said seat back is pivoted to each bracket below said first detent means.

12. The seat back attachment of claim 9 wherein said brackets each have a channel portion sized and shaped adapted to partially circumferentially encompass a corresponding one of said upright tubular members, a clamp detachably secured near an upper end of said channel portion and adapted to increase circumferential encompassment of said corresponding one of said upright tubular members, and a flange portion near a lower end of said channel portion, said seat back being pivoted to said flange portion below said detent plates.

13. A reclinable seat back attachment for a wheelchair having a wheelchair frame including a pair of upright tubular members normally supporting a non-reclining seat back, said seat back attachment comprising:

left and right attachment brackets, clamps for releasably securing each bracket to a respective one of said upright tubular members, a seat back pivoted to said attachment brackets, a detent plate pivotably attached to each said bracket, a guide slot defined in said plate and multiple detent notches opening laterally along said guide slot, detent pins extending from said seat back and captive in said guide slot of each detent plate, such that said pins may be engaged in a selected one of said multiple detent notches of each detent plate thereby to detain the seat back at the selected recline position, and a cross-member connecting rear ends of said detent plate by which both detent plates may be simultaneously lifted away from or lowered into engagement with a corresponding detent pin.

14. A reclinable seat back attachment for a wheelchair having a wheelchair frame including a pair of rear upright tubular members normally supporting a non-reclining seat back, said seat back attachment comprising:

left and right attachment brackets configured and adapted to be releasably fastened to respective ones of said rear upright tubular members;

a seat back pivoted to said attachment brackets;

first detent means secured to said brackets and second detent means on said seat back, said first and said second detent means being selectively engageable with each other for detaining said seat back at any one of multiple selectable recline positions; and a cross-member connected to one of said first and second detent means by which said first and second detent means may be disengaged from each other simultaneously on both of said left and right attachment brackets;

wherein said first detent means comprises a detent plate pivotably attached to a corresponding one of said brackets, and wherein said second detent means is a detent pin extending from said seat back and engageable in a selected one of multiple detent locations defined in said detent plate thereby to detain the seat back at the selected recline position.

15. A reclinable seat back attachment for a wheelchair having a wheelchair frame including a pair of rear upright tubular members normally supporting a non-reclining seat back, said seat back attachment comprising:

a pair of left and right attachment brackets each configured and adapted to be releasably fastened to respective ones of said rear upright tubular members;

a seat back pivotably supported on said brackets for adjustment between multiple selectable recline positions;

first detent means secured to said brackets at a first location and second detent means to said seat back at a second location spaced from said first location, said first and said second detent means being selectively engageable with each other for detaining said seat back at any one of said recline positions;

said brackets being supported in mutually spaced relationship by pivotal attachment to opposite sides of said seat back at said first location and by a cross member connected between said first detent means, said cross member being operative for simultaneously engaging and disengaging said detent means.

* * * * *